US011221084B2

(12) United States Patent
Rueda Calvet (10) Patent No.: US 11,221,084 B2
(45) Date of Patent: Jan. 11, 2022

(54) SELF-SEALING VALVE FOR AN INFLATABLE BODY AND METHOD FOR MANUFACTURING SAME

(71) Applicant: Jose Luis Rueda Calvet, Retalhuleu (GT)

(72) Inventor: Jose Luis Rueda Calvet, Retalhuleu (GT)

( * ) Notice: Subject to any disclaimer, the term of this patent is extended or adjusted under 35 U.S.C. 154(b) by 21 days.

(21) Appl. No.: 17/000,185

(22) Filed: Aug. 21, 2020

(65) Prior Publication Data
US 2021/0301937 A1   Sep. 30, 2021

Related U.S. Application Data

(63) Continuation of application No. 16/831,099, filed on Mar. 26, 2020.

(51) Int. Cl.
*F16K 21/04* (2006.01)
*B65D 47/20* (2006.01)

(52) U.S. Cl.
CPC .......... *F16K 21/04* (2013.01); *B65D 47/2031* (2013.01)

(58) Field of Classification Search
CPC .......................... F16K 21/04; B65D 47/2031
USPC ....................................................... 222/494
See application file for complete search history.

(56) References Cited

U.S. PATENT DOCUMENTS

| | | | | |
|---|---|---|---|---|
| 4,674,532 A | * | 6/1987 | Koyanagi | A63H 27/10 137/512.15 |
| 6,386,395 B1 | * | 5/2002 | Lunghetti | B65D 47/2081 222/213 |
| 8,469,240 B2 | * | 6/2013 | Wellman | F16K 15/147 222/494 |
| 8,568,130 B2 | * | 10/2013 | Ouviev | A23G 1/20 425/449 |
| 10,577,168 B1 | * | 3/2020 | Zimmerman | B65D 35/46 |
| 2005/0072788 A1 | * | 4/2005 | Lieberman | F16K 15/147 220/714 |
| 2009/0188950 A1 | * | 7/2009 | Gaus | B65D 47/2031 222/494 |
| 2015/0053726 A1 | * | 2/2015 | Heipp | B65D 47/2031 222/494 |
| 2019/0104825 A1 | * | 4/2019 | Kravchenko | A45D 40/26 |
| 2019/0218001 A1 | * | 7/2019 | Vredevoogd | B65D 47/0804 |

* cited by examiner

*Primary Examiner* — Paul J Gray
(74) *Attorney, Agent, or Firm* — Eugenio J. Torres-Oyola; Victor M Rodriguez-Reyes; Rafael Rodriguez-Muriel (57) ABSTRACT

A method for manufacturing a self-sealing valve for an inflatable body such as a toy balloon is disclosed. The method comprises immersing a mold in an immersion bath of an elastomeric material in liquid form and heating the mold in a heating device until a hollow tube element of an elastomeric material with a proximal end, a distal end, a cylindrical portion at the proximal end, a flat portion at the distal end having two flat sides, and a transition portion between the cylindrical portion and the flat portion is formed. The cylindrical portion is open at the proximal end and the flat portion is closed at the distal end with an opening on at least one of its flat sides. The valve is inserted in an inflatable body with the flat and transition portions of the hollow tube element located inside the inflatable body.

14 Claims, 7 Drawing Sheets

SELF-SEALING VALVE FOR AN INFLATABLE BODY AND METHOD FOR MANUFACTURING SAME

RELATED APPLICATIONS

This application is a continuation of U.S. application Ser. No. 16/831,099, filed on Mar. 26, 2020.

FIELD OF THE INVENTION

The present invention is directed to valves, in particular self-sealing valves for inflatable bodies such as balloons, and methods for manufacturing same. Specifically, the present inventions is directed to a system and method for inflating balloons without the need to use any additional steps to ensure that the air does not escape said balloon once inflated, eliminating the need for knots or seals. Furthermore, the present invention may be integrated to balloons during fabrication, making balloons self-sealing and allowing users to seamlessly and quickly inflate a large amount of balloons in a shorter time.

BACKGROUND OF THE INVENTION

Inflatable bodies such as toy balloons with means for closing the balloon after inflation are known in the art. For example, U.S. Pat. No. 3,108,396 discloses a tubular valve that is unrolled after inflation and then sealed by means of an adhesive being provided on the formerly rolled-up portion to seal the balloon. Such a construction requires manually activating the adhesive after inflation. U.S. Pat. No. 4,674,532 discloses a flat valve which comprises a flat valve body that is folded on itself and inserted in a flat fluid pipe and heat sealed therewith. Accordingly, this construction requires manually activating the adhesive after inflation. U.S. Pat. No. 5,295,892 discloses a balloon having two balloon sheets and a valve provided at the balloon stem between these sheets, wherein the valve is closed after inflation by heat-sealing. As in the cases above, this requires manually activating the adhesive after inflation. U.S. Pat. No. 9,643,099 discloses a valve that is sealed after inflation of the balloon by taking off a protective layer covering an adhesive layer. Like in the other cases, this requires manually activating the adhesive after inflation.

FR 719,244 and U.S. Pat. No. 2,795,425 disclose balloons with a tubular valve that is rolled up after inflation and then squeezed inside to seal the balloon. Thus, an additional adhesive is not needed, which simplifies the overall arrangement. However, like in the cases above using adhesives, the balloon still has to be sealed manually after inflation.

In contrast, U.S. Pat. Nos. 6,312,405 and 6,736,793 disclose a self-sealing valve for a balloon which consists of a cylindrical base portion and a cylindrical sealing portion having a smaller diameter than the base portion, wherein a pierce extends longitudinally through the valve and is closed by internal pressure when the balloon is inflated. Thus, this construction with its self-sealing feature saves the user the work of sealing the balloon manually after inflation. However, this valve construction is rather complicated and prone to failure.

U.S. Pat. Nos. 680,192, 947,559 and 1,008,641 show a different kind of self-sealing valve for balloons having a rounded inlet and a flat outlet which is closed by internal pressure when the balloon is inflated. This construction is simpler than the one of U.S. Pat. Nos. 6,312,405 and 6,736,793 above. Like U.S. Pat. Nos. 680,192, 947,559 and 1,008,641, WO 2008/127108 discloses a valve with a rounded inlet at the outer end of the balloon and a flat outlet inside the balloon, which closes automatically due to the internal pressure of the inflated balloon. The opening at the extreme end of the flat part is sticky such that at the flat and semi-glued end there is no distance or space between the walls. This is due to the fact that the rubber degraded when it was heated before during manufacturing. A piece of an existing balloon which has a tubular shape when inflated, is used, wherein one end thereof is flattened by applying heat, making it thinner and flatter, but also degrading it—this degradation, however, can proceed until the valve stops working properly over time. Furthermore, since a normal balloon latex is used, the valve does not have adequate rigidity already from the beginning.

Furthermore, U.S. Pat. No. 5,188,558 discloses a self-sealing valve that bonds to a plastic balloon that results in a self-sealing and refillable balloon. The device disclosed in U.S. Pat. No. 5,188,558 comprises an elongated plastic fill valve affixed inside a plastic balloon neck, with an inlet end and an outlet end. The inlet end has a hole which is in communication with another hole in the outlet end through which the air travels into the balloon through the valve. However, due to its flat shape and being made of plastic sheets, this disclosure may not be used with latex balloons that require a more flexible material in order to be able to seal into its usually round neck. Similarly, U.S. Pat. No. 4,917,646 discloses a self-sealing flexible plastic valve for a non-latex balloon made from two flexible plastic sheets, bonded together to define a valve inlet, a valve outlet and a valve passageway. However, due to its flat shape, it is not possible to use this valve with latex balloons.

China Patent CN204034267U discloses a self-sealing balloon which comprises a one-way air nozzle comprising a pump port that connects to a self-sealing hole located inside the balloon's body. This invention, however, is directly tied to the balloon itself and may not be used independently with any balloon.

Hence, there continues to be a need for a self-sealing valve for an inflatable body, such as a balloon, which is easy to manufacture, easy to use and reliable, and that may be used with different types of balloons.

SUMMARY OF THE INVENTION

The present invention overcome the limitations of the prior art to provide a self-sealing valve for an inflatable body that avoids the necessity of tying a knot so the air does not scape. It is easy to manufacture and reliable.

An object of the present invention is a self-sealing valve for an inflatable body, the valve comprising a hollow tube element of an elastomeric material with a proximal end; a distal end; a cylindrical portion at the proximal end; a flat portion at the distal end having two flat sides; and a transition portion between the cylindrical portion and the flat portion; wherein the cylindrical portion is open at the proximal end and the flat portion is closed at the distal end; and wherein the flat portion is provided with an opening on at least one of its flat sides.

Another object of the present invention is a method for manufacturing a self-sealing valve for an inflatable body, comprising the following steps: providing a mold comprising a proximal end, a distal end, a cylindrical portion at the proximal end, a flat portion at the distal end having two flat sides, a transition portion between the cylindrical portion and the flat portion; immersing the mold in an immersion bath, wherein the mold is immersed starting with its flat portion until its cylindrical portion is immersed at least partially in the immersion bath and wherein the immersion bath comprises an elastomeric material in liquid form; removing the mold from the immersion bath such that the flat and transition portions are completely covered by an elastomeric material layer and the cylindrical portion is at least partially covered by the elastomeric material layer; heating the mold with said elastomeric material layer thereon in a heating device until the elastomeric material layer is solid such that a hollow tube element is formed on the mold with a proximal end, a distal end, a cylindrical portion at the proximal end, a flat portion at the distal end having two flat sides and a transition portion between the cylindrical portion and the flat portion, wherein the cylindrical portion is open at the proximal end and the flat portion is closed at the distal end; removing the mold with the hollow tube element thereon from the heating device; and cutting an opening in at least one of the flat sides of the hollow tube element. Alternatively, the last step of cutting the opening in at least one of the flat sides of the hollow tube element can be omitted by providing at least one of the flat sides of the mold with a non-sticky area to avoid that the elastomeric material of the immersion bath adheres to the mold such that an opening in at least one of the flat sides of the hollow tube element is formed.

A further object of the present invention is a method for providing an inflatable body with a self-sealing valve, comprising the following steps: providing a valve manufactured as described above; applying an adhesive on at least part of the outer surface of the cylindrical portion of the hollow tube element; inserting the inlet portion of an inflatable body on the part of the outer surface of the cylindrical portion being covered by the adhesive such that the inflatable body is sealed and affixed to the hollow tube element and that the flat and transition portions of the hollow tube element are located inside the inflatable body and the cylindrical portion of the hollow tube element is located at least partially inside the inlet portion of the inflatable body; removing the hollow tube element with the inflatable body sealed and affixed thereto from the mold. Alternatively, the mold is provided with a non-sticky area in at least one of the flat sides of the hollow tube element, such that the opening in at least one of the flat sides of the hollow tube element is formed automatically and does not have to be cut out later.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings, which are incorporated herein, constitute part of the specifications and illustrate the preferred embodiment of the invention.

DESCRIPTION OF THE PREFERRED EMBODIMENTS

Inflatable bodies such as toy balloons with more or less elaborated means for sealing or even self-sealing the body after inflation have been known for a long time. However, as mentioned above, even state of the art arrangements suffer from drawbacks such as complicated structure, manufacturing and use.

As mentioned before, WO 2008/127108 discloses a valve, wherein a piece of a balloon is used, one end thereof being treated by applying heat to flatten it and to achieve sharp edges. The purpose of the latter is to close the microchannels—which are formed by the pressure exerted on the flat part of the valve by the air inside the balloon—in order to prevent air from escaping. However, the application of heat results in a degradation of the valve material, which, in turn, can proceed until the valve stops working properly.

The present invention overcomes these problems by providing a self-sealing valve for an inflatable body and a method for manufacturing same, as well as a method for providing an inflatable body with a self-sealing valve.

Figure 1A:
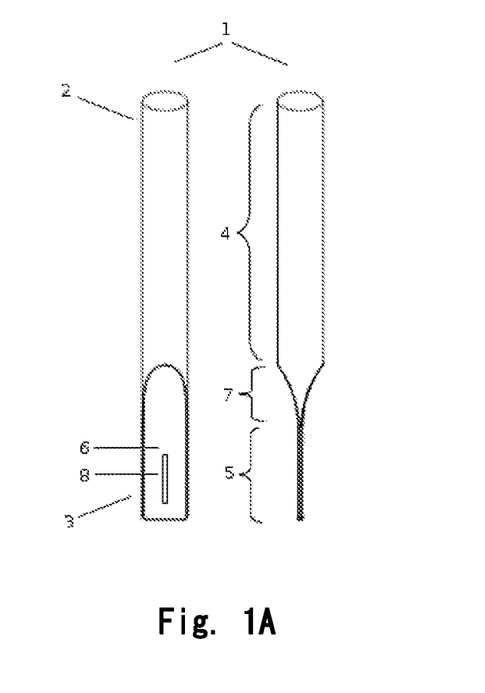
FIG. 1A shows the valve of the present invention in two views, wherein the second view is rotated along the longitudinal axis of the valve by 90 degrees in relation to the first view.
Figure 1B:
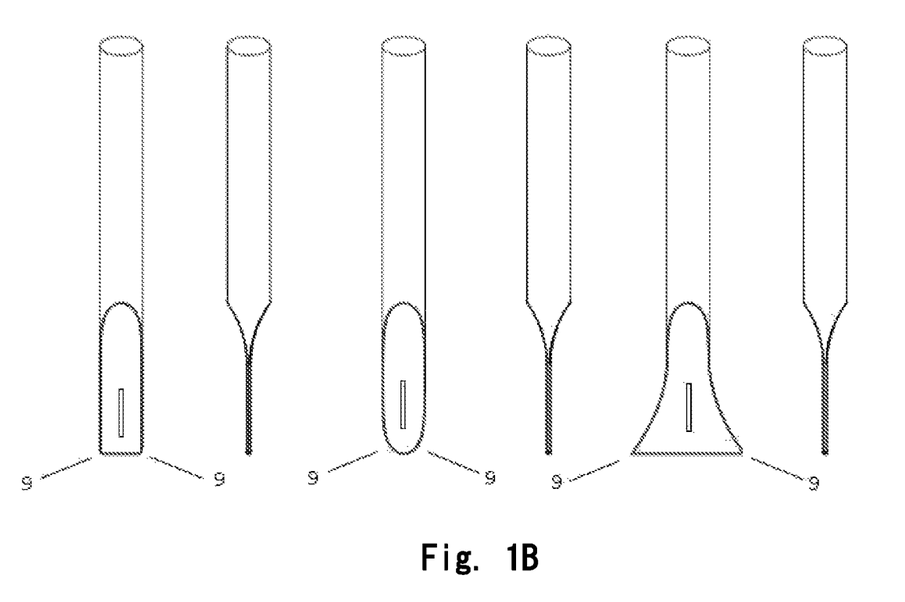
FIG. 1B shows the same views for different embodiments of the valve.

As shown in FIG. 1A, the valve comprises a hollow tube element 1 having an oblong shape with a longitudinal axis, such that the term "longitudinal", as used in this application, refers to a direction parallel to the longitudinal axis of the tube element 1. Accordingly, the term "transversal" refers to a direction in the plane orthogonal to the longitudinal direction. The hollow tube element 1 is made of an elastomeric material, wherein the tube element 1 has a proximal end 2 with a cylindrical portion 4, distal end 3 with a flat portion 5 and a transition portion 7 between the cylindrical portion 4 and the flat portion 5. The cylindrical portion 4 is open at the proximal end 2, and the flat portion 5 is closed at the distal end 3. The flat portion 5 has two flat sides 6, wherein at least one of the flat sides 6 is provided with an incision or opening 8. The edges 9 of the distal end 3 of the flat portion 5 can form homogeneous rectangles or duckbill shaped sections or can be rounded, as can be obtained from FIG. 1b. Other shapes are possible, of course. As explained in more detail later, the valve is inserted in an inflatable body 20 such as a toy balloon.

When the air inside the inflated body 20 exerts pressure on the hollow tube element 1, a security seal is generated around the incision 8, wherein the sides join together and seal the air outlet. This results in a much more reliable closing than the valve according to WO 2008/127108. Furthermore, since the valve according to the present invention is manufactured using a mold which is immersed in an immersion bath, the end of the flat part 5 of the valve does not stick or degrade such that the walls are spaced from each other and only come together after inflation due to the pressure exerted by the air inside the inflatable body. This allows to obtain sufficient rigidity, thickness and weight such that the valve is not expelled from the balloon.

Figure 1C:
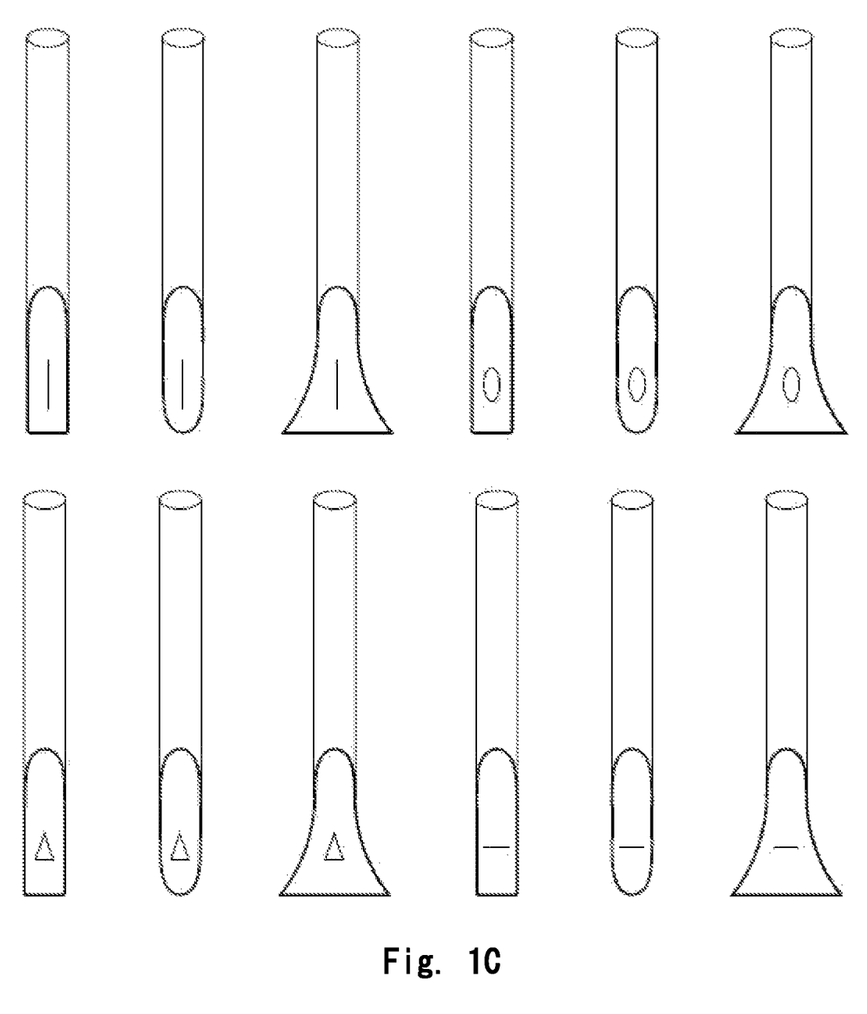
FIG. 1C shows the same views for different embodiments of the opening of the valve

In a preferred embodiment, the longitudinal length of the flat portion 5 of the hollow tube element 1 is between ¼ and ⅓ of the total longitudinal length of the tube element 1 and the longitudinal length of the cylindrical portion 4 is between ⅓ and ½ of the total longitudinal length of the tube element 1. The opening 8 can be provided on one of the flat sides only or on both and can have a narrow oblong shape extending in a longitudinal or transversal direction (as shown FIG. 1C). In a preferred embodiment, the length of the narrow opening 8 is between ⅓ and ⅔ of the longitudinal length of the flat portion 5. In alternative embodiments, the opening 8 can have a rounded or any polygonal shape including triangles, squares and ovals, as shown in FIG. 1C. In these cases, the area of such a round or polygonal opening is preferably between ¼ and ¾ of a transversal cross section (i.e., the circular area) of the inlet portion 21 of the inflatable body 20 in order to allow air to be pumped into the inflatable body without undue burden on the user.

The size of the valve depends on the size of the inflatable body 20. In general, the total longitudinal length of the hollow tube element 1 is between 50 and 150 mm, the longitudinal length of the flat portion is between 10 and 40 mm, the cylindrical portion diameter and the flat portion width is between 5 and 20 mm, and the radius of curvature of the transition portion 7 is between 28 mm and 42 mm The hollow tube element 1 is formed by a continuous layer of an elastomeric nanocomposite based on natural rubber, wherein the nanocomposite can consist of natural latex and octahedral mineral hydroxysilicates. In other embodiments, the continuous layer of elastomeric material can be based on synthetic latices, wherein the synthetic latices can consist of polyneoprene, polybutadiene or polyacrylonitrile. In still other embodiments, the continuous layer can be based on a vulcanized natural rubber latex blended with fillers. Pre-vulcanization is preferred to accelerate the manufacturing process. All these materials result in sufficient rigidity of the valve, in contrast to the prior art. Furthermore, pigments can be added to the continuous layer material.

The thickness of the continuous layer is preferably between 500 μm and 1000 μm, the tensile strength between 15 N and 25 N and the elongation modulus greater than at least 300% of the original length. These values result in optimum performance of the valve regarding accuracy, sealing performance and lifetime.

Figure 2A:
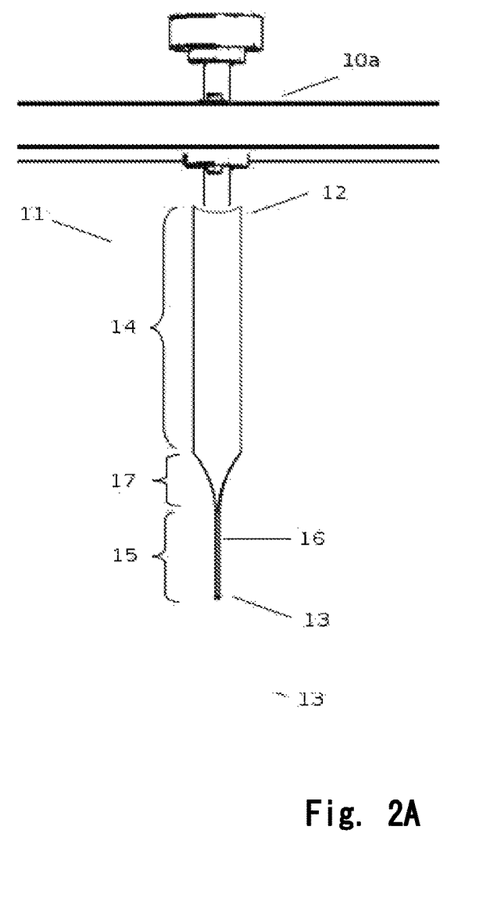
FIG. 2A shows the mold for manufacturing the valve of FIGS. 1A and 1B according to the present invention.

The valve is manufactured using a mold 11 as shown in FIG. 2A and having a proximal end 12, a distal end 13, a cylindrical portion 14 at the proximal end 12, a flat portion 15 at the distal end 13 having two flat sides 16, and a transition portion 17 between the cylindrical portion 14 and the flat portion 15. The shape of this mold corresponds to the shape of the valve disclosed above because the hollow tube element 1 of the valve is formed by immersing the mold 11 in an immersion bath 10b comprising an elastomeric bath material in liquid form. The mold 11 is attached to an essentially horizontal immersion rod 10a or the like with its proximal end 12 facing the rod 10a and its distal end 13 facing downwardly. The immersion is achieved by displacing the rod 10a vertically in a downward direction towards the immersion bath 10b. Accordingly, the mold 11 is immersed in the immersion bath 10b starting with its flat portion 15 until its cylindrical portion 14 is immersed at least partially in the immersion bath 10b. When the mold 11 has been immersed in the immersion bath 10b up to its desired longitudinal length, it is removed from the immersion bath 10b again—with the result that the flat 15 and transition 17 portions of the mold 11 are completely covered by the elastomeric immersion bath material, whereas the cylindrical portion 14 of the mold is at least partially covered by the elastomeric immersion bath material. This elastomeric immersion bath material forms a layer on the mold 11.

After removing the mold 11 with the elastomeric immersion bath material layer thereon by moving the rod 10a upwardly again, the rod 10a with the layer covered mold 11 thereon is put in a heating device until the elastomeric material layer on the mold 11 is solid such that the hollow tube element 1 mentioned above is formed on the mold 11. As mentioned above when describing the valve, the hollow tube element 1 has a proximal end 2, a distal end 3, a cylindrical portion 4 at the proximal end 2, a flat portion 5 at the distal end 3 having two flat sides 6, a transition portion 7 between the cylindrical portion 4 and the flat portion 5, wherein the cylindrical portion 4 is open at the proximal end 2 and the flat portion 5 is closed at the distal end 3.

Figure 2B:
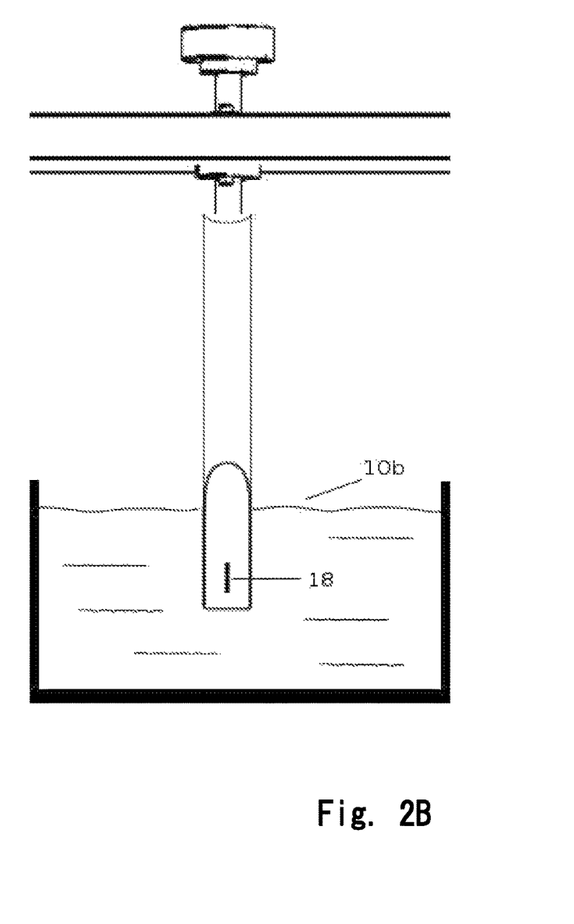
FIG. 2B shows the mold of FIG. 2A provided with a non-sticky area, wherein the mold is partly immersed in the immersion bath.

Finally, the rod 10a with the mold 11 and the hollow tube element 1 layer thereon is removed from the heating device and an opening 8 is cut in at least one of the flat sides 6 of the hollow tube element 1 (as shown in FIG. 1C). Cutting the opening 8 can be performed using rotating blades, high-pressure water jets, pulse blades resistors or electric arcs. Alternatively, the step of cutting the opening 8 in at least one of the flat sides 6 of the hollow tube element 1 can be omitted by providing at least one of the flat sides 6 of the mold 11 with a non-sticky area 18 (as shown in FIG. 2b) to avoid that the elastomeric immersion bath material adheres to the mold 11 such that the opening 8 in at least one of the flat sides 6 of the hollow tube element 1 is simply formed by lack of elastomeric immersion bath material. This opening can be of irregular geometry. The non-sticky area 18 can be created, for example, by applying a material such as silicone, polyurethane, hydrophobic varnish or lipophobic varnish.

Due to the immersion rod 10a arrangement, many molds can be used simultaneously by providing them next to each other on the rod 10a which is then immersed in the bath 10b. In this way, many hollow tube elements 1 can be formed at the same time which allows production of the valve at an industrial scale because the immersion rod 10a can be displaced—using any known conveying mechanism—between different stations such as the immersion, heating and opening cutting stations of the process described above and further on to the adhesive application, inflatable body insertion and mold removing stations of the process described below. It should be noted that, due to this arrangement, valves with different shapes can be manufactured at the same time by attaching different molds 11 to the immersion rod 10a.

Suitable materials for the mold 11 are polypropylene, aluminum, glass, porcelain, stainless steel and wood.

As mentioned in connection with the valve above, the elastomeric immersion bath material can be a nanocomposite based on natural rubber, wherein the nanocomposite can consist of natural latex and octahedral mineral hydroxysilicates. In other embodiments, the continuous layer of elastomeric material can be based on synthetic latices, wherein the synthetic latices can consist of polyneoprene, polybutadiene, polyacrylonitrile. In still other embodiments, the continuous layer can be based on a vulcanized natural rubber latex blended with fillers. In all cases pigments can be added to the continuous layer material. Before, immersing the mold 11 in the immersion bath 10*b*, the mold 11 is dipping in a coagulant which can comprise a calcium nitrate salt, talcum and surfactants.

Optionally, after removing the mold 11 from the immersion bath 10*b*, the mold 11 with the elastomeric immersion bath material layer thereon can be dipped in talcum before the mold 11 with the elastomeric immersion bath material layer is heated in the heating device.

Figure 3:
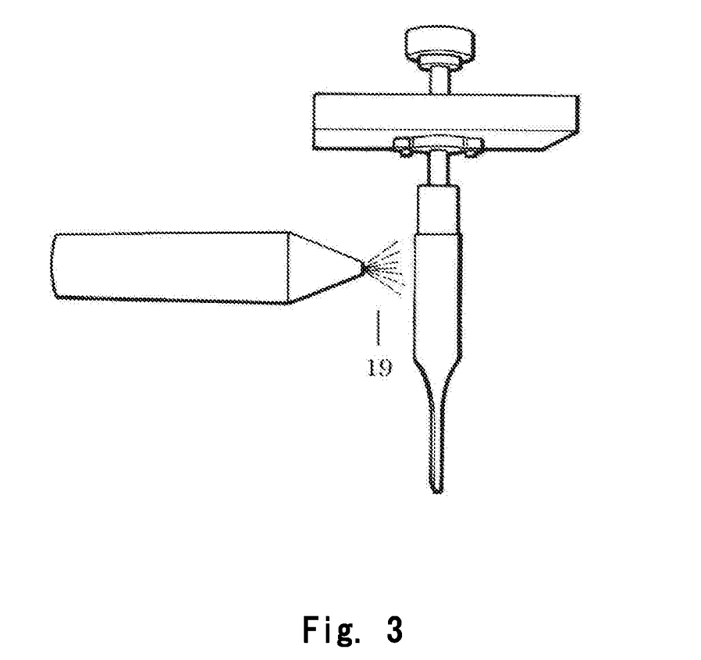
FIG. 3 shows the application of adhesive after immersing the mold of FIG. 2A in an immersion bath.

The valve so manufactured is then inserted in the inflatable body 20. In a first step, an adhesive 19 is applied on at least part of the outer surface of the cylindrical portion 4 of the hollow tube element 1 as shown in FIG. 3. The application of the adhesive can be performed by spraying as shown in FIG. 3 or by using rollers, brushes or sponges. The adhesive 19 can be applied at the proximal end 2 of the cylindrical portion 4 or in a longitudinally centered area of the cylindrical portion 4 (as indicated in FIG. 3). Furthermore, the adhesive can be applied in a continuous manner or in stripes, dots etc. Generally, the longitudinal length of the area provided with the adhesive can be between 10 and 25 mm. At this stage, the hollow tube element 1 still forms a layer on the mold 11 which, in turn, is still attached to the immersion rod 10*a*.

As mentioned in connection with the valve manufacturing above, a production at industrial scale is possible due to the fact that the immersion rod 10*a* with the molds 11 and hollow tube elements 1 thereon can be moved to different process stations.

Figure 4:
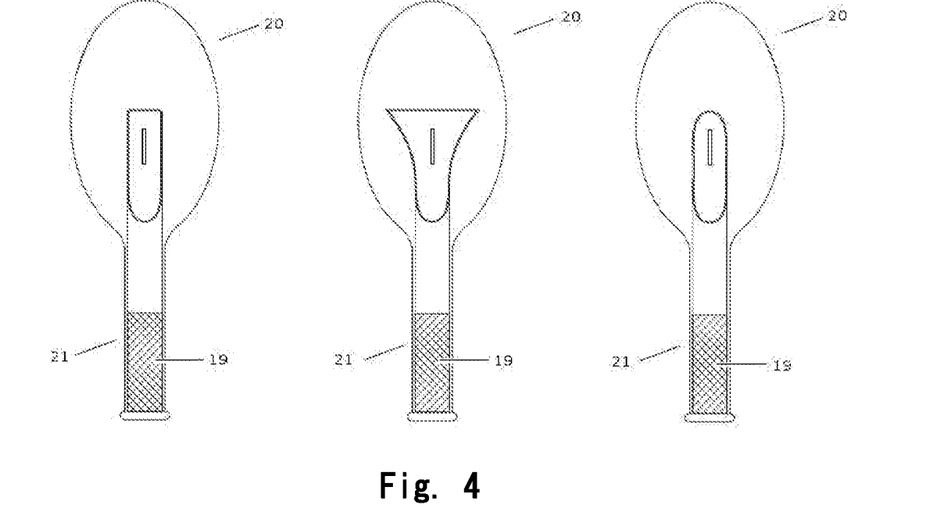
FIG. 4 shows the valves of FIG. 1B inserted in an inflatable body.
Figure 5:
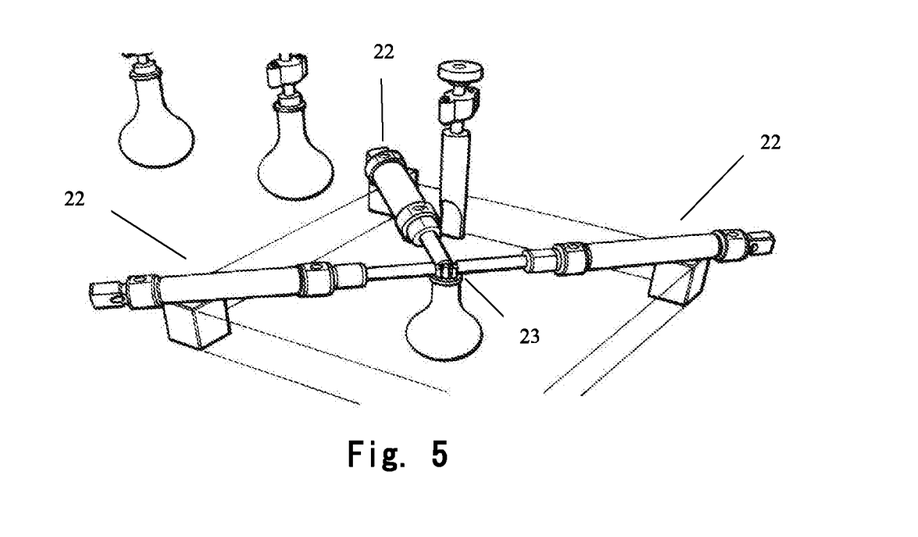
FIG. 5 shows the device for inserting the inflatable body of FIG. 4 on the valve.
Figure 6:
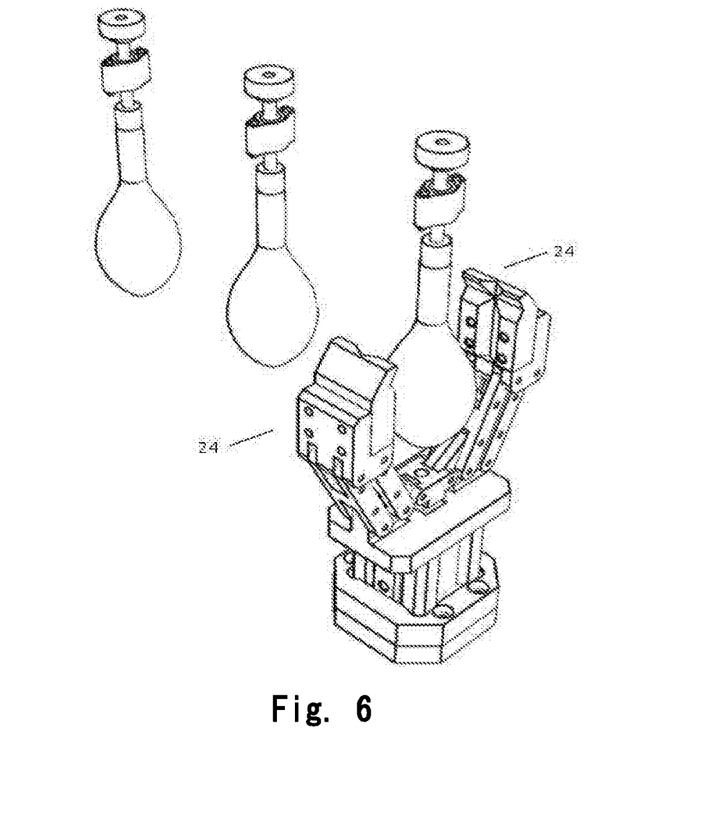
FIG. 6 shows the device for removing the inflatable body with the valve of FIG. 5 from the mold.

Then the immersion rod 10*a* with the molds 11 and the hollow tube elements 1 thereon can be displaced to the insertion station. Here, the inlet portion 21 of the inflatable body 20 is inserted on the part of the outer surface of the cylindrical portion 4 which is covered by the adhesive 19 such that the inflatable body 20 is sealed and affixed to the hollow tube element 1. As shown in FIG. 5, the insertion can be achieved, for example, by means of cylinders 22 with opening hooks 23 for stretching the inlet portion 21 of the inflatable body 20, which can be a latex toy balloon, in four axial directions and releasing it after having been inserted over the part of the outer surface of the cylindrical portion 4 being covered by the adhesive 19. The hollow tube element 1 is inserted in the inflatable body in such a way that the flat 5 and transition 7 portions of the hollow tube element 1 are located inside the inflatable body 20 and the cylindrical portion 4 of the hollow tube element 1 is located at least partially inside the inlet portion 21 of the inflatable body 20 as can be obtained from FIG. 4. The hollow tube element 1 still forms a layer on the mold 11 which, in turn, is still attached to the immersion rod 10*a* at this stage, as well. Then, the immersion rod 10*a* with the molds 11, the hollow tube elements 1 and the inflatable bodies 20 thereon can be displaced to the mold removal station. Here, the hollow tube element 1 with the inflatable body 20 sealed and affixed thereto is removed from the mold 11 which still suspends from the immersion rod 10*a*. As shown in FIG. 6, the removal can be achieved with clamping pliers 24 for removing the hollow tube element 1 with the inflatable body 20 sealed and affixed thereto by direct pressure.

Finally, the inflatable body 20 provided with the valve can be washed at a cleaning station and then packed for commercial distribution at a packing station.

Figure 7:
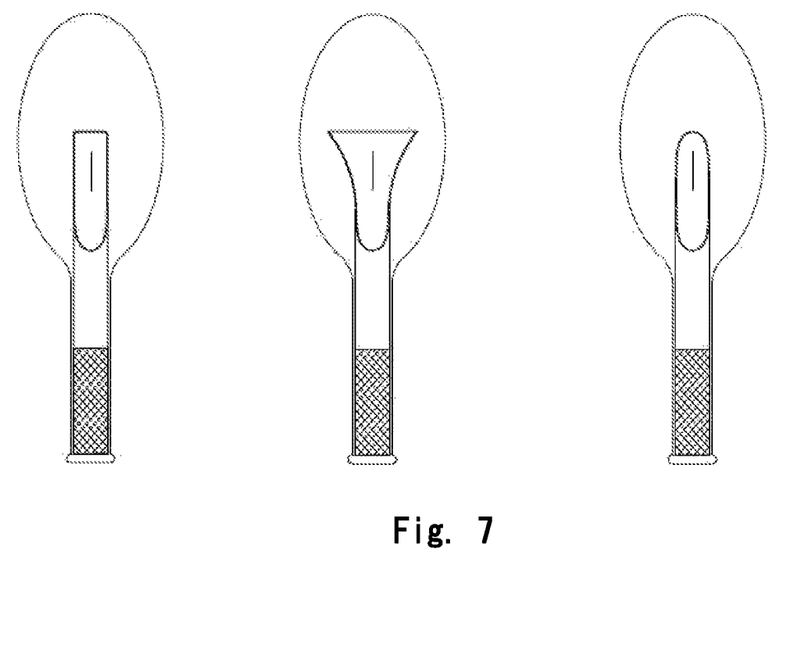
FIG. 7 shows an inflatable body with a self-sealing valve

The manufacturing process above results in an inflatable body 20 which comprises a built-in-self-sealing valve (as shown in FIG. 7) and which is ready for being filled with a fluid such as, e.g., gas or air.

As mentioned above, the inflatable body 20 provided with the self-sealing valve is closed automatically by the internal pressure in the inflatable body after inflation which generates a security seal around the opening(s) 8 at the side(s) 6 of the flat portion 3 by pressing the sides together.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A method for manufacturing a self-sealing valve for an inflatable body, comprising the following steps:
   providing a mold comprising:
      a proximal end;
      a distal end;
      a cylindrical portion at the proximal end;
      a flat portion at the distal end having two flat sides; and
      a transition portion between the cylindrical portion and the flat portion;
   immersing the mold in an immersion bath, wherein the immersion bath comprises an elastomeric material in liquid form;
   removing the mold from the immersion bath such that the flat and transition portions are completely covered by an elastomeric material layer and the cylindrical portion is at least partially covered by the elastomeric material layer;
   heating the mold with said elastomeric material layer thereon in a heating device until a hollow tube element is formed on the mold comprising:

a proximal end;
a distal end;
a cylindrical portion at the proximal end;
a flat portion at the distal end having two flat sides; and
a transition portion between the cylindrical portion and the flat portion;
wherein the cylindrical portion is open at the proximal end and the flat portion is closed at the distal end; and
cutting an opening in at least one of the flat sides of the hollow tube element.

2. The method according to claim 1, wherein a material of the mold is chosen from a group consisting of polypropylene, aluminum, glass, porcelain, stainless steel and wood.

3. The method according to claim 1, wherein the elastomeric material comprises a nanocomposite latex.

4. The method according to claim 3, wherein the nanocomposite latex is pre-vulcanized.

5. The method according to claim 1, wherein the elastomeric material comprises a vulcanized natural rubber latex blended with fillers.

6. The method according to claim 1, wherein the mold is dipped in a coagulant before it is immersed in the immersion bath.

7. The method according to claim 1, wherein the step of removing the mold from the immersion bath is followed by the step of dipping the mold with said elastomeric material layer thereon in talcum before the step of heating the mold with said elastomeric material layer thereon in a heating device.

8. The method according to claim 1, wherein the step of cutting an opening in at least one of the flat sides of the hollow tube element is performed by means chosen from a group consisting of rotating blades, high-pressure water jets, pulse blades resistors and electric arcs.

9. A method for manufacturing an inflatable body with a self-sealing valve manufactured according to claim 1, comprising the following steps:
applying an adhesive on at least part of the outer surface of the cylindrical portion of the hollow tube element;
inserting in an inlet portion of an inflatable body the part of the outer surface of the cylindrical portion of the self-sealing valve being covered by the adhesive, such that the inflatable body is sealed and affixed to the hollow tube element and that the flat and transition portions of the hollow tube element are located inside the inflatable body and the cylindrical portion of the hollow tube element is located at least partially inside the inlet portion of the inflatable body;
removing the hollow tube element with the inflatable body sealed and affixed thereto from the mold.

10. The method according to claim 9, wherein the step of applying an adhesive on at least part of the outer surface of the cylindrical portion is performed by spraying or by applying with rollers, brushes or sponges.

11. The method according to claim 9, wherein the inflatable body is a latex toy balloon and wherein the step of inserting in an inlet portion of an inflatable body the part of the outer surface of the cylindrical portion of the self-sealing valve being covered by the adhesive is performed by means of cylinders with opening hooks for stretching the inlet portion of the latex toy balloon in four axial directions and releasing it after inserting the part of the outer surface of the cylindrical portion of the self-sealing valve covered by a layer of the adhesive.

12. The method according to claim 9, wherein the step of removing the hollow tube element with the inflatable body sealed and affixed thereto from the mold is performed by means of clamping pliers for removing the hollow tube element with the inflatable body sealed and affixed thereto by direct pressure.

13. A method for manufacturing a self-sealing valve for an inflatable body, comprising the following steps:
providing a mold comprising:
a proximal end;
a distal end;
a cylindrical portion at the proximal end;
a flat portion at the distal end having two flat sides, wherein at least one of the flat sides is provided with a non-sticky area; and
a transition portion between the cylindrical portion and the flat portion;
immersing the mold in an immersion bath, wherein the immersion bath comprises an elastomeric material in liquid form;
removing the mold from the immersion bath such that the flat portion, except for the non-sticky area which forms an opening, is completely covered by an elastomeric material layer, the transition portion is completely covered by the elastomeric material layer and the cylindrical portion is at least partially covered by the elastomeric material layer;
heating the mold with said elastomeric material layer thereon in a heating device until a hollow tube element is formed on the mold comprising:
a proximal end;
a distal end;
a cylindrical portion at the proximal end;
a flat portion at the distal end having two flat sides and an opening on at least one of the flat sides; and
a transition portion between the cylindrical portion and the flat portion;
wherein the cylindrical portion is open at the proximal end and the flat portion is closed at the distal end.

14. The method according to claim 13, wherein the non-sticky area is obtained by applying material chosen from a group consisting of silicone, polyurethane, hydrophobic varnish, lipophobic varnish.

* * * * *